United States Patent
Raff et al.

(10) Patent No.: US 12,436,822 B2
(45) Date of Patent: Oct. 7, 2025

(54) LOCKING IN MULTI-NODE ENVIRONMENTS

(71) Applicant: Dell Products L.P., Round Rock, TX (US)

(72) Inventors: Jason Raff, Bedford, NH (US); Shari Vietry, Merrimack, NH (US); Ben Beauregard, Merrimack, NH (US)

(73) Assignee: Dell Products L.P., Round Rock, TX (US)

(*) Notice: Subject to any disclaimer, the term of this patent is extended or adjusted under 35 U.S.C. 154(b) by 72 days.

(21) Appl. No.: 18/380,935

(22) Filed: Oct. 17, 2023

(65) Prior Publication Data

US 2025/0123904 A1    Apr. 17, 2025

(51) Int. Cl.
  *G06F 9/52* (2006.01)
  *G06F 9/48* (2006.01)

(52) U.S. Cl.
  CPC .............. *G06F 9/52* (2013.01); *G06F 9/4881* (2013.01)

(58) Field of Classification Search
  None
  See application file for complete search history.

(56) References Cited

U.S. PATENT DOCUMENTS

| | | | |
|---|---|---|---|
| 6,389,420 B1 | 5/2002 | Vahalia et al. | |
| 6,973,455 B1 | 12/2005 | Vahalia et al. | |
| 7,047,299 B1 * | 5/2006 | Curtis | G06F 9/526 709/225 |
| 7,120,631 B1 | 10/2006 | Vahalia et al. | |
| 9,244,868 B2 * | 1/2016 | Samanta | G06F 11/00 |
| 11,366,594 B2 | 6/2022 | Raff et al. | |
| 11,416,441 B2 | 8/2022 | Shveidel et al. | |
| 11,662,946 B2 | 5/2023 | Shveidel et al. | |
| 2016/0350357 A1 * | 12/2016 | Palmer | G06F 16/2365 |
| 2020/0250051 A1 * | 8/2020 | Chen | G06F 3/067 |
| 2020/0322136 A1 * | 10/2020 | Irazabal | H04L 9/088 |
| 2022/0350787 A1 * | 11/2022 | Shveidel | G06F 16/2379 |
| 2023/0004448 A1 * | 1/2023 | Shveidel | G06F 9/466 |
| 2023/0009529 A1 * | 1/2023 | Meiri | G06F 12/10 |

* cited by examiner

*Primary Examiner* — Henry Tsai
*Assistant Examiner* — Aurangzeb Hassan
(74) *Attorney, Agent, or Firm* — BainwoodHuang

(57) ABSTRACT

A technique is directed to sharing a page of memory among a first processing node and a second processing node. The technique includes provisioning the first processing node with a first queue and the second processing node with a second queue. The technique further includes configuring the first processing node to enqueue, within the first queue, local lock requests to assign lock ownership of the page to the first processing node and peer lock requests to assign lock ownership of the page to the second processing node. The technique further includes configuring the second processing node to enqueue, within the second queue, the peer lock requests to provide lock ownership coordination of the page among the first processing node and the second processing node.

20 Claims, 6 Drawing Sheets

Secondary Node 310(b)

| Mutex Page | LBA | Lock Type | Outstanding Lock Count | Lock Queue | Acknowledgement Count |
|---|---|---|---|---|---|
| Page 162(1) | 17 | Exclusive | 1 | Queue 320(b) | 0 |
| Page 162(2) | 28 | None | 0 | Queue 520(b) | 1 |
| Page 162(3) | 152 | Shared | 6 | Queue 620(b) | 1 |

LOCKING IN MULTI-NODE ENVIRONMENTS

BACKGROUND

A conventional data storage system includes multiple storage processors that have access to shared resources (e.g., data stored in a buffer cache). To prevent data corruption, the data storage system assigns locks on the resources to individual storage processors. The locks exclude other storage processors from accessing the same resources.

In the conventional data storage system, the storage processors manage their own lock requests and exchange messages with each other to confirm lock availability. For example, when a first storage processor requires a lock on a shared resource, the first storage processor generates a lock request and sends a message to a peer storage processor to confirm that the lock is available. The first storage processor then waits to receive a reply from the peer storage processor before acquiring the lock. However, if the first storage processor receives a message identifying a lock request of a higher-priority storage processor before receiving the reply to its own message, then the first storage processor will cancel its own lock request to allow the higher-priority storage processor to acquire the lock.

SUMMARY

Unfortunately, there are deficiencies in the conventional data storage system in which the storage processors send and receive messages to confirm lock availability. Along these lines, such messages are not guaranteed to be received in order, e.g., the first storage processor may erroneously receive message identifying a lock request of a higher-priority storage processor before an earlier-sent reply to its own message. As a result, the storage processors waste resources canceling requests, processing late replies that correspond to the now-canceled requests, and retrying the requests. Moreover, even when the storage processors properly confirm lock ordering, the storage processors alternate lock ownership between each other after each lock request, regardless of whether one storage processor generates more requests than another storage processor.

In contrast to the above-described conventional data storage system, improved techniques are directed to configuring a first processing node to manage not only its own local lock requests, but also peer lock requests from a second processing node. Along these lines, the first processing node is provisioned with a first queue to enqueue both the local lock requests and peer lock requests. When processing a peer lock request, the first processing node removes the request from the first queue and sends the request to the second processing node, which uses a second queue to acquire locks. In this manner, the first processing node manages lock ordering of both processing nodes, avoiding issues arising from out-of-order messaging and enabling the processing nodes to distribute access to the page proportionally to the amount of lock requests from each of the processing nodes.

One embodiment is directed to a method of sharing a page of memory among a first processing node and a second processing node. The method includes provisioning the first processing node with a first queue and the second processing node with a second queue. The method further includes configuring the first processing node to enqueue, within the first queue, local lock requests to assign lock ownership of the page to the first processing node and peer lock requests to assign lock ownership of the page to the second processing node. The method further includes configuring the second processing node to enqueue, within the second queue, the peer lock requests to provide lock ownership coordination of the page among the first processing node and the second processing node.

Another embodiment is directed to an electronic environment that includes memory and control circuitry coupled with the memory. The memory stores instructions that, when carried out by the control circuitry, cause the control circuitry to perform a method of sharing a page of the memory between the first processing node and the second processing node, the method including:
(A) provisioning the first processing node with a first queue and the second processing node with a second queue;
(B) configuring the first processing node to enqueue, within the first queue, local lock requests to assign lock ownership of the page to the first processing node and peer lock requests to assign lock ownership of the page to the second processing node; and
(C) configuring the second processing node to enqueue, within the second queue, the peer lock requests to provide lock ownership coordination of the page among the first processing node and the second processing node.

Yet another embodiment is directed to a computer program product having a non-transitory computer readable medium that stores a set of instructions to share a page of memory among a first processing node and a second processing node, the set of instructions, when carried out by computerized circuitry, causes the computerized circuitry to perform a method of:
(A) provisioning the first processing node with a first queue and the second processing node with a second queue;
(B) configuring the first processing node to enqueue, within the first queue, local lock requests to assign lock ownership of the page to the first processing node and peer lock requests to assign lock ownership of the page to the second processing node; and
(C) configuring the second processing node to enqueue, within the second queue, the peer lock requests to provide lock ownership coordination of the page among the first processing node and the second processing node.

In some arrangements, the method further includes assigning lock ownership of the page to one of the first processing node and the second processing node in accordance with lock requests enqueued within the first queue.

In some arrangements, the method further includes enqueuing a peer lock request in the first queue, the peer lock request being received at the first processing node from the second processing node. Additionally, the method further includes, after the peer lock request reaches a head of the first queue, removing the peer lock request from the first queue and enqueuing the peer lock request within the second queue to assign lock ownership of the page to the second processing node.

In some arrangements, the method further includes, after the peer lock request reaches the head of the first queue, transmitting a response to the second processing node to enqueue the peer lock request in the second queue. Additionally, the method further includes, after receiving an acknowledgment message from the second processing node, processing a second lock request in the first queue. In these arrangements, the acknowledgment message indicates that the second processing node received the response and is provided to maintain lock ordering between the first processing node and the second processing node.

In some arrangements, the method further includes, after transmitting the response to the second processing node, incrementing an acknowledgment count of the page. In these arrangements, the acknowledgment count indicates a number of outstanding acknowledgment messages for the page between the first processing node and the second processing node. Additionally, processing the second lock request includes:

(A) performing a comparison operation that compares the acknowledgment count to a predefined threshold; and (B) in response to the comparison operation indicating that the acknowledgment count is less than the predefined threshold, granting the second lock request.

In some arrangements, the method further includes, in response to a local lock request reaching a head of the first queue, transmitting a lock request message to the second processing node. In these arrangements, the lock request message indicates the local lock request to the second processing node. Additionally, the method further includes, after receiving a reply to the lock request message from the second processing node, assigning lock ownership of the page to the first processing node and sending a reply acknowledgment message to the second processing node. In these arrangements, the reply acknowledgment message indicates that the first processing node received the reply to the lock request message.

In some arrangements, the first processing node and the second processing node are constructed and arranged to perform access operations on pages in memory in atomically committed transactions. Additionally, the method further includes:

(A) processing a first lock request to assign lock ownership of the page in a first transaction; and (B) after processing the first lock request, processing a second lock request to assign lock ownership of the page in a second transaction, the first processing node and the second processing node using the page as a mutex to serialize the first transaction and the second transaction.

In some arrangements, the method further includes receiving instructions to perform a first set of input/output (I/O) requests before a second set of I/O requests. Additionally, the method further includes, in response to receiving the instructions, generating the first lock request and the second lock request to serialize the first set of I/O requests in the first transaction and the second set of I/O requests in the second transaction.

In some arrangements, the page includes a mutex flag that identifies the page as a mutex. Further, the method further includes, in response to detecting the mutex flag, refraining from performing a deadlock detection operation on the page to conserve processor resources.

This Summary is provided merely for purposes of summarizing some example embodiments so as to provide a basic understanding of some aspects of the disclosure. Accordingly, it will be appreciated that the above-described example embodiments are merely examples and should not be construed to narrow the scope or spirit of the disclosure in any way. Other embodiments, aspects, and advantages will become apparent from the following detailed description taken in conjunction with the accompanying drawings which illustrate, by way of example, the principles of the described embodiments.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

FIG. 5 is a block diagram illustrating additional features of a processing node in accordance with certain embodiments.

DETAILED DESCRIPTION

An improved technique is directed to configuring a first processing node to manage not only its own local lock requests, but also peer lock requests from a second processing node. Along these lines, the first processing node is provisioned with a first queue to enqueue the local lock requests and the peer lock requests. When processing a peer lock request, the first processing node removes the request from the first queue and sends the request to the second processing node, which uses a second queue to acquire locks. In this manner, the first processing node manages the order in which lock requests are processed, avoiding issues arising from out-of-order messaging and enabling the processing nodes to distribute access to the page proportionally to the amount of lock requests from the processing nodes.

The various individual features of the particular arrangements, configurations, and embodiments disclosed herein can be combined in any desired manner that makes technological sense. Additionally, such features are hereby combined in this manner to form all possible combinations, variants and permutations except to the extent that such combinations, variants and/or permutations have been expressly excluded or are impractical. Support for such combinations, variants and permutations is considered to exist in this document.

Figure 1:
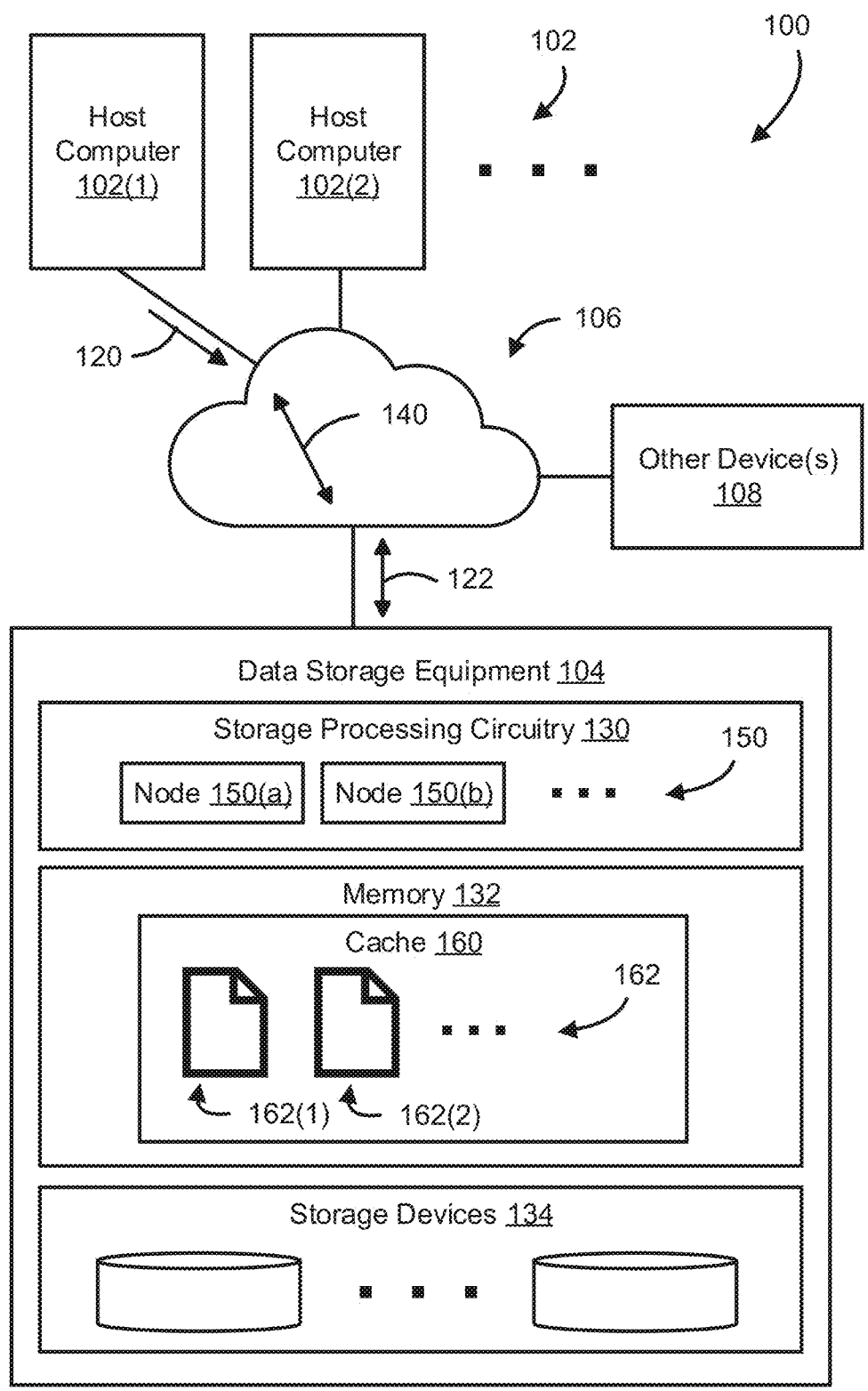
FIG. 1 is a block diagram of an example electronic environment in accordance with certain embodiments.

FIG. 1 shows an example electronic environment 100 that provides lock management in accordance with certain embodiments. The electronic environment 100 includes host computers 102(1), 102(2), . . . (collectively, host computers 102), data storage equipment 104, a communications medium 106, and optionally other devices 108.

Each of the host computers 102 is constructed and arranged to perform useful work. In some embodiments, one or more of the host computers 102 operate as a file server, a web server, an email server, an enterprise server, a database server, a transaction server, combinations thereof, etc. which provide host input/output (I/O) requests 120 to the data storage equipment 104. In some embodiments, the host computers 102 provide a variety of different host I/O requests 120 (e.g., block and/or file-based write commands, block and/or file-based read commands, combinations thereof, etc.) that direct the data storage equipment 104 to richly and reliably store host data 122 within and retrieve the host data 122 from storage (e.g., primary storage or main memory, secondary storage, tiered storage, combinations thereof, etc.).

The data storage equipment 104 (e.g., a storage array, a storage system, etc.) includes storage processing circuitry 130, memory 132, and storage devices 134. The storage processing circuitry 130 is constructed and arranged to respond to the host I/O requests 120 from the host computers 102 by accessing pages of the memory 132 and writing data into the storage devices 134 and reading the data from the storage devices 134.

The storage processing circuitry 130 includes processing nodes 150(a), 150(b), . . . (collectively, nodes 150). The nodes 150 are constructed and arranged to have shared access to pages of memory. Along these lines, the nodes 150 are constructed and arranged to generate lock requests to obtain locks on the pages, e.g., to prevent data corruption. A first processing node 150(a) is configured to enqueue, within a first queue, not only local lock requests (e.g., lock requests to assign lock ownership of the page to the first processing node 150(a)), but also peer lock requests (e.g., lock requests to assign lock ownership of the page to a second processing node 150(b)). In this manner, the first processing 150(a) is configured to manage lock requests of the multiple nodes 150. In some embodiments, the storage processing circuitry 130 includes one or more physical storage processors (SPs) or engines, data movers, director boards, blades, I/O modules, storage device controllers, switches, other hardware, combinations thereof, and so on.

The memory 132 includes, among other features, a cache 160 constructed and arranged to store pages 162(a), 162(b), . . . (collectively, pages 162). In some embodiments, the nodes 150 are constructed and arranged to use the pages 162 as mutexes to serialize access operations in different transactions. For example, suppose that the node 150(a) receives an I/O request to perform a first set of operations before a second set of operations (e.g., a volume delete operation before a volume create operation). In response, the node 150(a) obtains a first lock on the page 162(1) in a first transaction and performs the first set of operations in the first transaction. Later, the node 150(a) obtains a second lock on the same page 162(1) in a second transaction and performs the second set of operations in the second transaction. In this manner, the page 162(1) acts as a mutex that enables the node 150(a) to the serialize the first and second sets of operations.

The storage devices 134 provide persistent/non-volatile storage in accordance with one or more RAID data protection schemes and may include one or more types of storage drives, e.g., non-volatile random access memory (NVRAM) devices, solid state drives (SSDs), hard disk drives (HDDs), combinations thereof, and so on.

In accordance with certain embodiments, at least some of the storage devices 134 provide non-volatile storage using a mapped-RAID architecture. Moreover, in accordance with certain embodiments, various physical componentry may be virtualized for additional flexibility, fault tolerance, load balancing, and so on (e.g., virtual data movers, virtual storage devices, etc.).

The communications medium 106 is constructed and arranged to connect the various components of the storage system setting 100 together to enable these components to exchange electronic signals 140 (e.g., see the double arrow 140). At least a portion of the communications medium 106 is illustrated as a cloud to indicate that the communications medium 106 is capable of having a variety of different topologies including backbone, hub and spoke, loop, irregular, combinations thereof, and so on. Along these lines, the communications medium 106 may include copper based data communications devices and cabling, fiber optic devices and cabling, wireless devices, combinations thereof, etc. Furthermore, the communications medium 106 is capable of supporting LAN-based communications, SAN based communications, cellular communications, WAN-based communications, distributed infrastructure communications, other topologies, combinations thereof, etc.

The other devices 108 represent other possible componentry of the storage system setting 100. Along these lines, the other devices 108 may include remote data storage equipment that provides data to and/or receives data from the data storage equipment 104 (e.g., replication arrays, backup and/or archiving equipment, service processors and/or management/control devices, combinations thereof, etc.).

During operation and as will be explained in further detail shortly, the multiple nodes 150 of the storage processing circuitry 130 share access to the pages 162 to process I/O requests. Along these lines, the multiple nodes 150 generate lock requests to obtain a lock on a page. The nodes 150 then provide the lock requests to the primary node 150(a) configured to enqueue and process the lock requests of the multiple nodes 150. When the primary node 150(a) processes a lock request of the secondary node 150(b), the primary node 150(a) sends the lock request to the secondary node 150(b) to assign a lock on the page to the secondary node 150(b). In this manner, the primary node 150(a) manages lock requests of the multiple nodes 150. Further details will now be provided with reference to FIG. 2.

Figure 2:
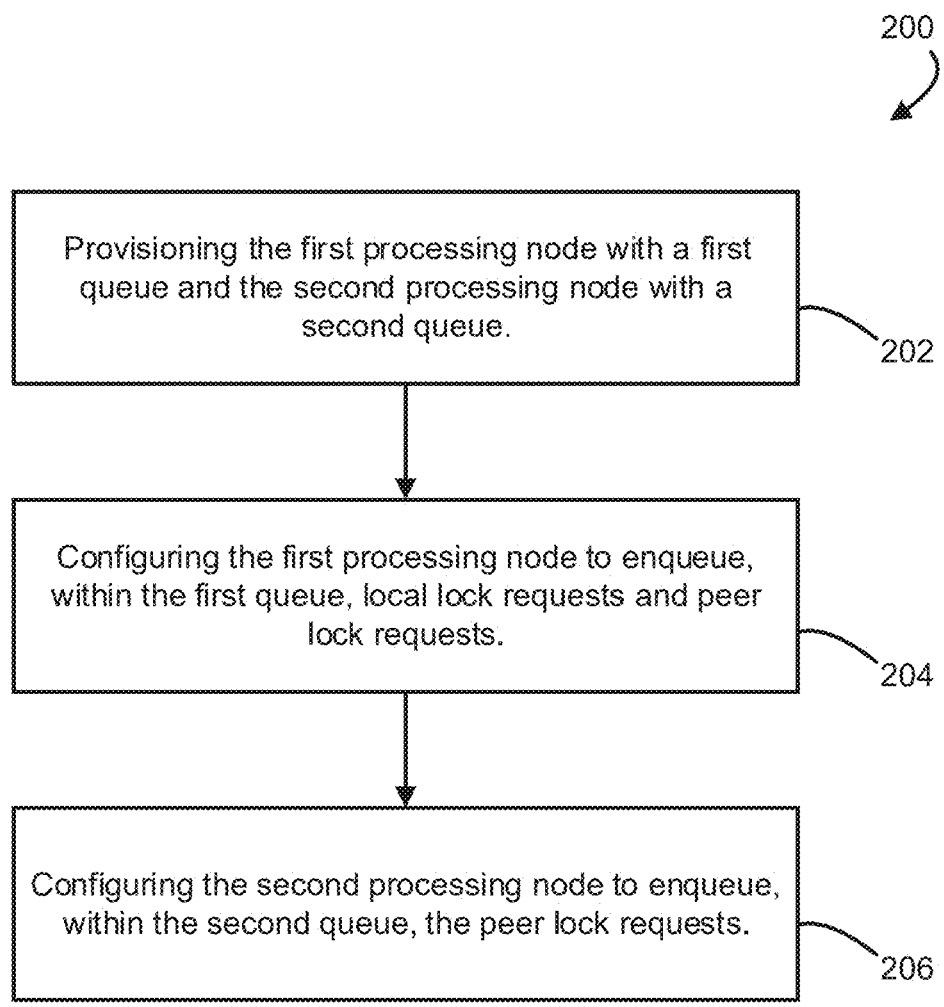
FIG. 2 is a flowchart of a procedure which is performed by specialized equipment in accordance with certain embodiments.

FIG. 2 is a flowchart of a procedure 200 which is performed by specialized equipment in accordance with certain embodiments. The procedure 200 carries out sharing the page 162(1) of the memory 132 between the first processing node 150(a) and the second processing node 150(b).

At 202, the first processing node 150(a) is provisioned with a first queue and the second processing node 150(b) is provisioned with a second queue. In some embodiments, the queues are first-in, first-out (FIFO) queues of waiting lock requests to lock the page 162(1).

At 204, the first processing node 150(a) is configured to enqueue, within the first queue, both local lock requests and peer lock requests. The local lock requests are lock requests to assign lock ownership of the page to the first processing node 150(a). The peer lock requests are lock requests to assign lock ownership of the page to the second processing node 150(b). In some embodiments, the second processing node 150(b) is constructed and arranged to generate and transmit the peer lock requests to the first processing node 150(a) and temporarily refrain from enqueuing the peer lock requests in the second queue until receiving a response from the first processing node 150(a). In some embodiments, both the local lock requests and the peer lock requests are generated in response to receiving an I/O request from a component in the storage processing circuitry 130 (e.g., a namespace).

At 206, the second processing node 150(b) is configured to enqueue, within the second queue, the peer lock requests to provide lock ownership coordination of the page 162(1) among the first processing node 150(a) and the second processing node 150(b). In some embodiments, the second processing node 150(b) enqueues a peer lock request after the second processing node 150(b) sends the peer lock request to the first processing node 150(a) to enqueue in the first queue, the peer lock request reaches a head of the first queue, and the first processing node 150(a) sends a response to the second processing node 150(a). Further details will now be provided with reference to FIG. 3.

Figure 3:
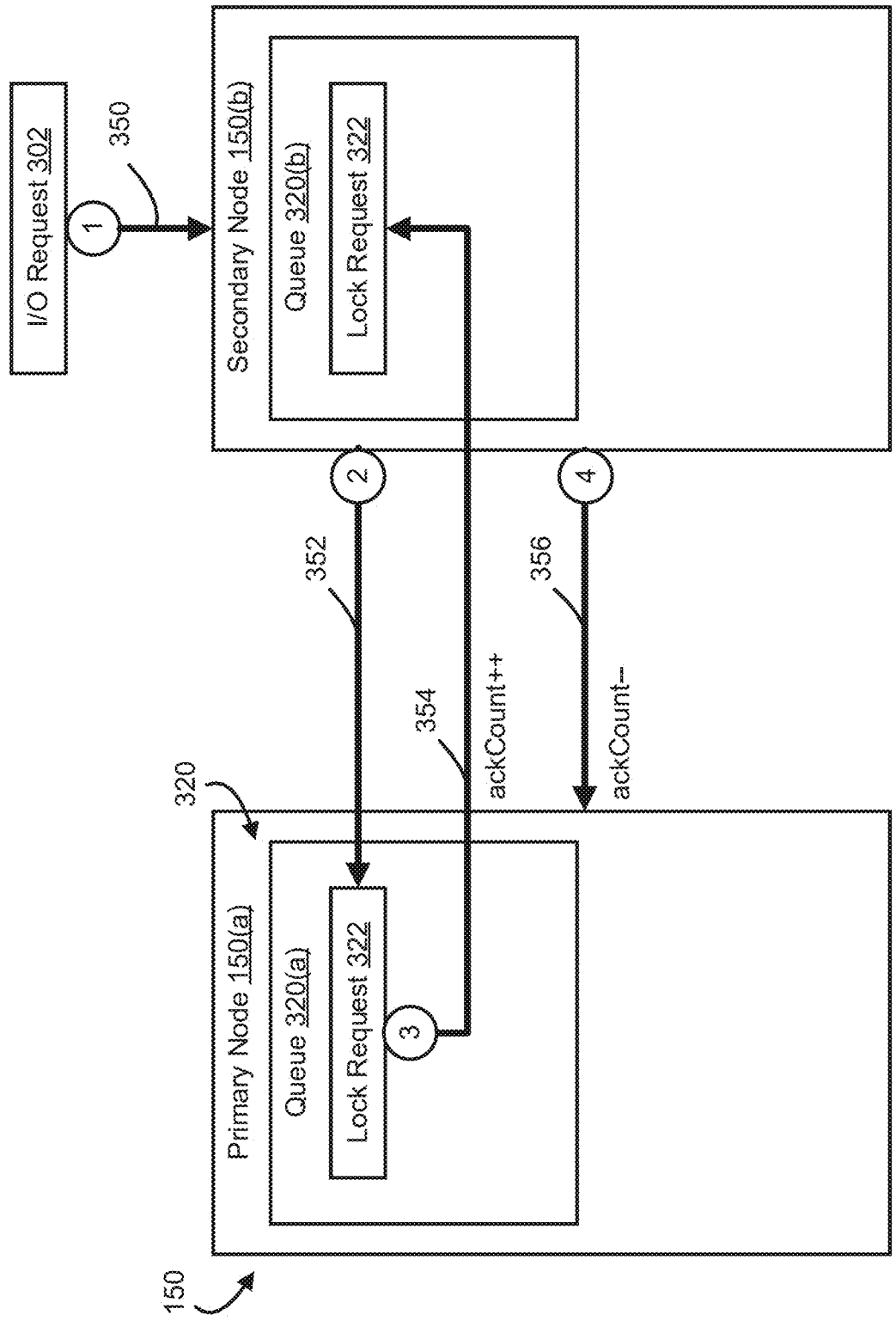
FIG. 3 is a block diagram of multiple processing nodes in which a secondary processing node receives an input/output (I/O) request in accordance with certain embodiments.

FIG. 3 shows certain details for lock management in accordance with certain embodiments. As shown, the processing nodes 150(a) and 150(b) (FIG. 1) include respective lock wait queues 320(a) and 320(b) (collectively, queues 320) for the page 162(1) of the memory 132.

The queues 320 are constructed and arranged to enqueue lock requests to lock the page 162(1) (e.g., lock request 322, etc.). In some embodiments, the queues 320 are constructed and arranged to enqueue lock request for only the page 162(1). In some embodiments, the queues 320 store both local lock requests (e.g., lock requests to assign lock ownership of the page to a local node) and peer lock requests (e.g., lock requests to assign lock ownership of the page to a peer node).

As shown, the node 150(a) is designated as a primary node and the node 150(b) is designated as a secondary (or non-primary) node. In some embodiments, primary and secondary designations are assigned at a predetermined time, e.g., at startup, after a predetermined time interval, upon receiving an input/output (I/O) request, combinations thereof, etc. Examples of how the nodes 150 assign designations include random assignment, according to node characteristics, etc.

During operation, the primary node 150(a) manages lock requests of both of the nodes 150. For example, when the secondary node 150(b) receives an I/O request 302 (as shown by arrow 350), the node 150(b) generates a lock request 322 to assign a lock on the page 162(1) to the secondary node 150(b). Rather than immediately inserting the lock request 322 into the queue 320(b) of the secondary node 150(b), the secondary node 150(b) instead sends the lock request 322 to the primary node 150(a) (as shown by arrow 352). The primary node 150(a) then inserts the lock request 322 into its queue 320(a), which is configured to contain both local lock requests to assign a lock on the page 162(1) to the primary node 150(a) and peer lock requests to assign a lock on the page 162(1) to the secondary node 150(b) (e.g., the lock request 322). In this manner, the primary node 150(a) manages the lock requests of both of the nodes 150.

When the lock request 322 reaches the head of the queue 320(a), the primary node 150(a) removes the lock request 322 from the queue 320(a) and sends a response to the secondary node 150(b) (as shown by arrow 354). In some embodiments, the response includes an instruction for the secondary node 150(b) to enqueue the lock request 322 in the queue 320(b).

Thereafter, the secondary node 150(b) transmits an acknowledgment message that acknowledges the response from the primary node 150(a) (as shown by arrow 356). Advantageously, the acknowledgment message enables the primary node 150(a) to track whether the secondary node 150(b) received the instruction to enqueue the lock request 322.

In some embodiments, after the primary node 150(a) sends the lock request 322, the primary node 150(a) increments an acknowledgment count, e.g., a count that indicates a number of outstanding acknowledgment messages for the page between the nodes 150. Later, when the primary node 150(a) receives the acknowledgment message from the secondary node 150(b), the primary node 150(a) then decrements the acknowledgment count. While the acknowledgment count is greater than or equal to a predetermined threshold, the primary node 150(a) refrains from granting additional lock requests from the queue 320(a). In some embodiments, the primary node 150(a) grants additional lock requests only after receiving all outstanding acknowledgment messages. In this manner, the primary node 150(a) prevents multiple messages from being received out of order and becoming stale. These features enable the secondary node 150(b) to insert lock requests in order, avoiding potential data corruption.

In some embodiments, the I/O request 302 is sent from a component of the storage processing circuitry 130 (e.g., a namespace) and instructs one or more of the nodes 150 to perform order-dependent operations (e.g., a volume delete operation before a volume create operation). In some embodiments, the nodes 150 use the pages 162 as mutexes to serialize operations. For example, suppose that the I/O request 302 instructs the node 150(b) to perform a first set of operations before a second set of operations. In response, the node 150(b) generates two lock requests to be performed in separate transactions. In this manner, the node 150(b) performs the first set of operations while the node 150(b) holds a lock on the page 162(1) in the first transaction and later performs the second set of operations while the node 150(b) holds a lock on the same page 162(1) in the second transaction. In some embodiments, the pages 162 include a respective mutex flags that identify the pages 162 as mutexes.

Although only lock request 322 is illustrated in FIG. 3 for simplicity, it should be understood that, in some embodiments, the queues 320 contain more or fewer lock requests. Further, it should be understood that the nodes 150 are provided for example purposes, and in some embodiments, storage processing circuitry 130 includes additional nodes. Further details will now be provided with reference to FIG. 4.

Figure 4:
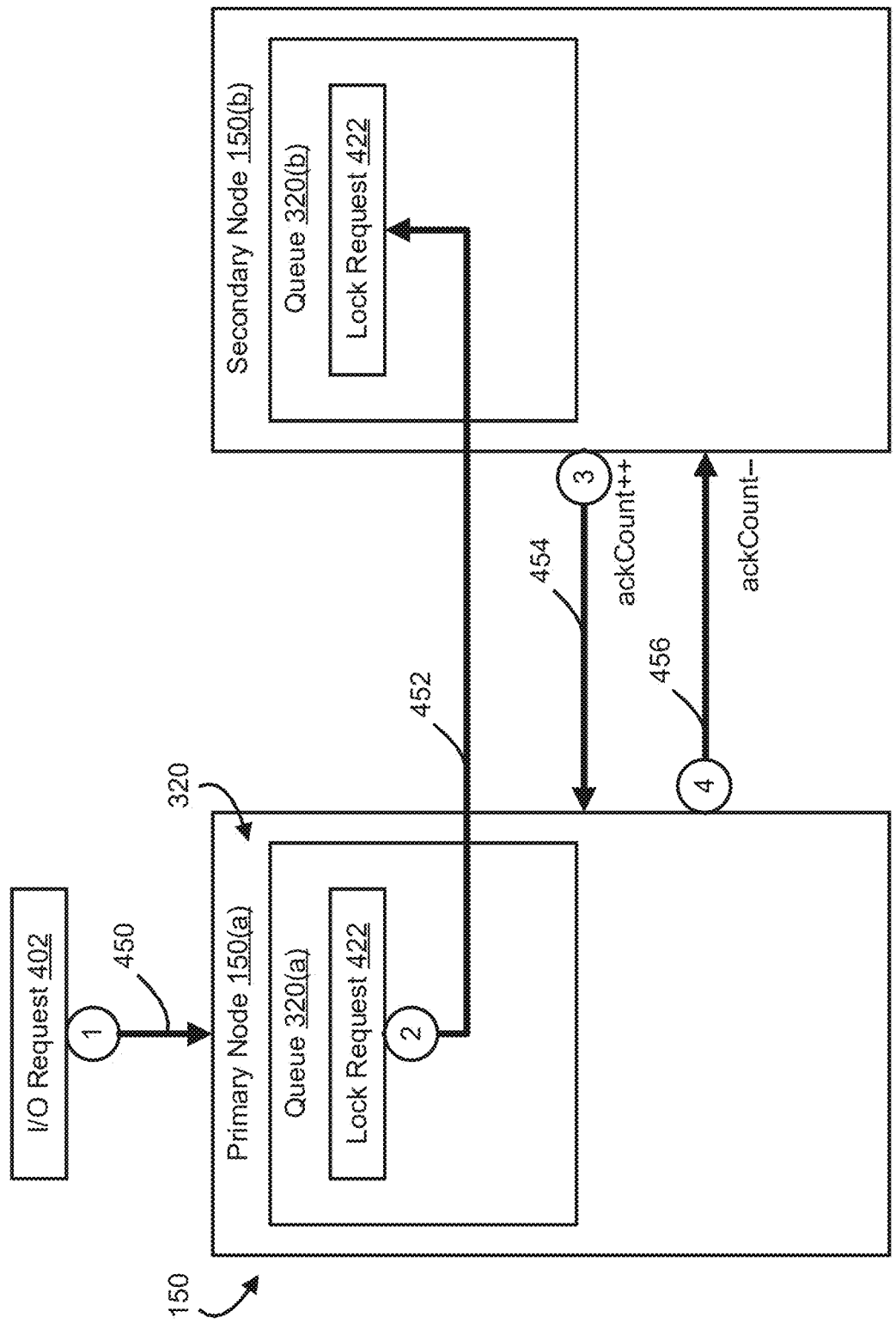
FIG. 4 is a block diagram of multiple processing nodes in which a primary processing node receives an I/O request in accordance with certain embodiments.

FIG. 4 shows certain details for lock management in accordance with certain embodiments. FIG. 4 includes the processing nodes 150 and lock wait queues 320 as shown in FIG. 3.

During operation, the primary node 150(a) manages lock requests of both of the nodes 150. For example, when the primary node 150(b) receives an I/O request 402 (as shown by arrow 450), the primary node 150(a) generates a lock request 422 to assign a lock on the page 162(1) to the primary node 150(a). In this case, the primary node 150(a) inserts the lock request 422 into its own queue 320(a). As described above in connection with FIG. 3, the queue 320(a) is configured to contain both local lock requests to assign a lock on the page 162(1) to the primary node 150(a) and peer lock requests to assign a lock on the page 162(1) to the secondary node 150(b). In this manner, the primary node 150(a) manages the lock requests of both of the nodes 150.

In some embodiments, the I/O request 402 is sent from a component of the storage processing circuitry 130 (e.g., a namespace) similarly to the I/O request 302 described above in connection with FIG. 3. Likewise, in some embodiments, the I/O request instructs one or more of the nodes 150 to perform order-dependent operations (e.g., a volume delete operation before a volume create operation).

When the lock request 422 reaches the head of the queue 320(a), the primary node 150(a) removes the lock request 422 from the queue 320(a) and sends a lock request message to the secondary node 150(b) (as shown by arrow 452). In some embodiments, the lock request message indicates the lock request 422 and includes a confirmation request for the secondary node 150(b) to confirm that a lock is available for the primary node 150(a) to grant the lock request 422. In some embodiments, the confirmation request is enqueued in the same queue 320(b) that the secondary node 150(b) uses to processes other requests.

Thereafter, the secondary node 150(b) transmits a reply (as shown by arrow 454) indicating that the secondary node 150(b) has enqueued the lock request 422 in its queue 320(b) pursuant to the lock request message. The primary node 150(a) then sends a reply acknowledgement message (as shown by arrow 456) to the secondary node 150(b) indicating that the primary node 150(a) received the reply.

In some embodiments, after the secondary node 150(b) sends the reply, the secondary node 150(b) increments a reply acknowledgment count, e.g., a count that indicates a number of outstanding reply acknowledgment messages for the page between the nodes 150. Later, when the secondary node 150(b) receives the reply acknowledgment message from the primary node 150(a), the secondary node 150(b) then decrements the reply acknowledgment count.

While the reply acknowledgment count is greater than or equal to a predetermined threshold, the secondary node 150(b) refrains from sending lock requests to the primary node 150(a) (e.g., the lock request 322 from FIG. 3). For example, in some embodiments, the secondary node 150(b) transmits lock requests only after receiving all outstanding reply acknowledgment messages. In this manner, the secondary node 150(b) prevents multiple messages from being received out of order and becoming stale. Advantageously, these features enable the secondary node 150(b) to avoid using resources to cancel and resend lock requests, thereby enabling the nodes 150 to avoid resource starvation due to repeatedly canceled lock requests. Further details will now be provided with reference to FIG. 5.

FIG. 5 shows certain details for lock management in accordance with certain embodiments. As shown, the secondary node 150(b) is constructed and arranged to manage a mutex table 560 managed by the secondary node 150(b). Although only the secondary node 150(b) for simplicity, the primary node 150(a) is constructed and arranged to manage a similar mutex table for the same or different pages. In some embodiments, the mutex table 560 is a hash table that associates table entries to certain data objects as described herein.

Column 562 includes a list of mutex pages. As described above in connection with FIG. 3, in some embodiments, the nodes 150 use the pages 162 as mutexes to serialize I/O operations (e.g., operations pursuant to the I/O requests 302, 402, etc.).

Column 564 provides logical block addresses (LBA) of the mutex pages. In some embodiments, each mutex page identifies exactly one LBA. In some embodiments, the LBA of each mutex page is configured to point to no host data in secondary storage (e.g., the storage devices 134 as shown in FIG. 1).

Column 566 provides lock types indicating access levels that the node 150(b) has on the mutex pages. Example lock types include exclusive, shared, none, combinations thereof, etc.

Column 568 provides outstanding lock counts for the mutex pages. In some embodiments, an outstanding lock count of a page indicates a number of transactions in which the node 150(b) owns a lock on the page. For example, when the node 150(b) owns an exclusive lock on the page and no other locks, the outstanding lock count on the page is 1. For shared locks, the outstanding lock count may be any number greater than zero. When the node 150(b) does not own any locks, the outstanding lock count is zero.

Column 570 provides lock queues for the mutex pages. For example, the node 150(b) uses the queue 320(b) to manage lock requests of the page 162(1) and another queue 520(b) to manage lock requests of the page 162(2).

Column 572 provides acknowledgment counts for the mutex pages. For example, in the secondary queue 150(b), the acknowledgment count indicates a number of outstanding reply acknowledgment messages as described in FIG. 4. Similarly, in the primary queue 150(a), the acknowledgment count indicates a number of outstanding acknowledgment messages as described in FIG. 3.

In some embodiments, each of the nodes 150 maintains a mutex table. It should be understood that mutex tables of different nodes may contain entries for the same pages, but provide different information. For example, as shown, the mutex table 560 of the node 150(b) identifies the queue 320(b) for page 162(1). However, a similar mutex table of the node 150(a) instead identifies the queue 320(a) for the same page 162(1).

During operation, the node 150(b) accesses and adjusts entries in the mutex table 560 to manage the locks in the queue. For example, when the node 150(b) releases a lock on a page, the node 150(b) updates a respective entry in the lock type column 566 and decrements a respective outstanding lock count in the outstanding lock type column 568. In this manner, the node 150(b) richly and reliably manages access to the mutex pages.

In another example, when the node 150(b) receives the I/O request 302 (FIG. 3), the node 150(b) generates the lock request 322 to lock the page and checks a respective entry in the acknowledgment count column 572 of the mutex table 560. The node 150(b) then performs a comparison operation comparing the acknowledgment count to a predetermined threshold. In response to the comparison operation indicating that the acknowledgment count is less than a predetermined threshold, the node 150(b) transfers the lock request 322 to the primary node 150(a), as discussed above in connection with FIG. 3.

In some embodiments, the nodes 150 are constructed and arranged to identify whether a page has a mutex flag set when the nodes 150 access a page in a transaction. The mutex flag identifies the page as being a mutex listed in the mutex table 560. As the page is used as a mutex for transaction ordering, the page is understood to not point to any host data. In this manner, the nodes 150 refrain unnecessarily attempting to locate or load nonexistent host data from secondary storage.

In some embodiments, each of the mutex pages provide exactly one LBA. These features enable the nodes 150 to conserve processor resources by refraining from performing deadlock avoidance operations involving the page, e.g., an operation to detect whether granting a lock on the page would cause multiple transactions to prevent one another from completing and releasing their locks. Further details will now be provided with reference to FIG. 6.

Figure 6:
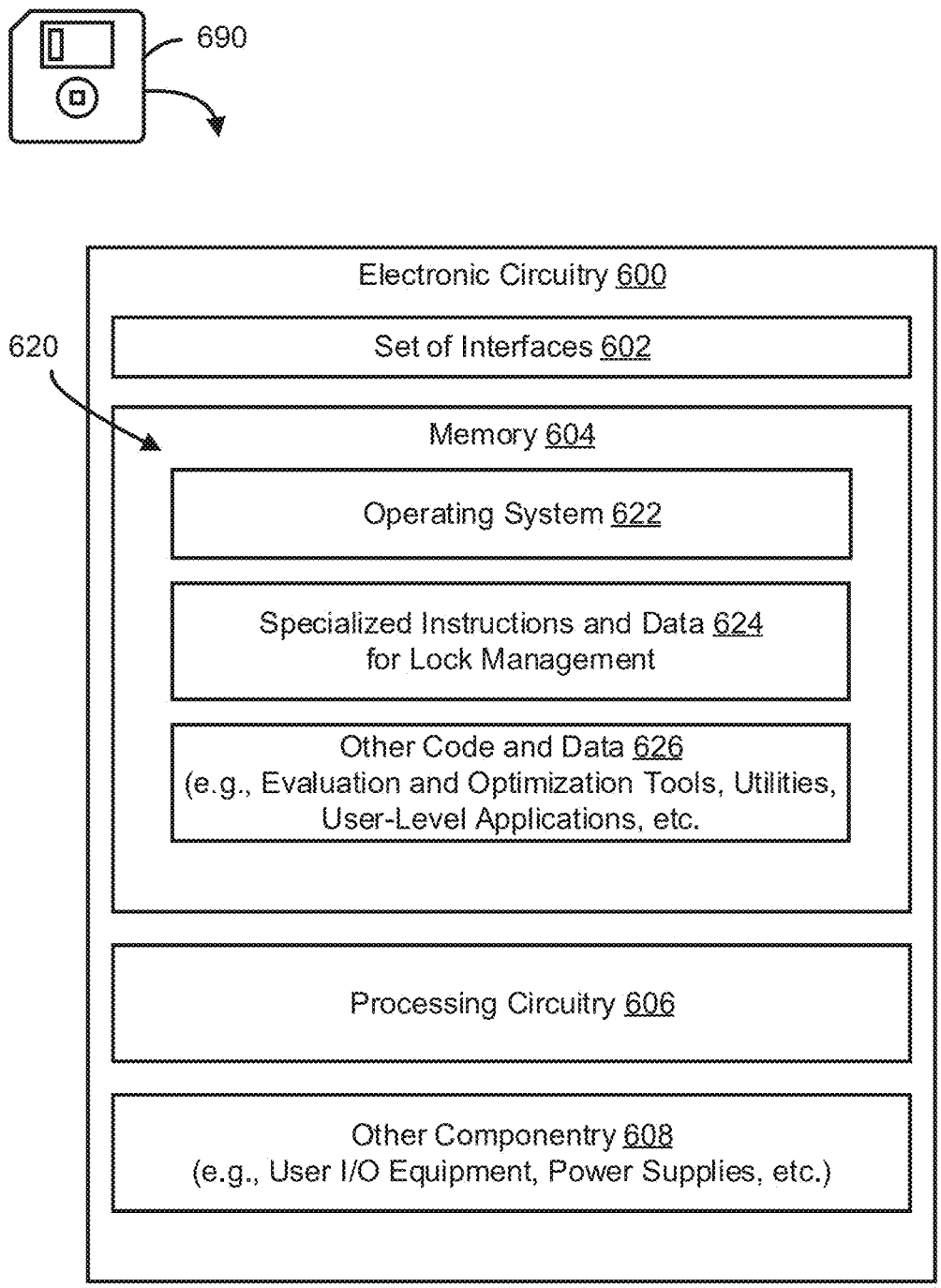
FIG. 6 is a block diagram of example electronic circuitry in accordance with certain embodiments.

FIG. 6 is a block diagram of electronic circuitry 600 which is suitable for at least a portion of the data storage equipment 104 (FIG. 1) in accordance with certain embodiments. The electronic circuitry 200 includes a set of interfaces 602, memory 604, processing circuitry 606, and other circuitry 608.

The set of interfaces 602 is constructed and arranged to connect the electronic circuitry 600 to the communications medium 106 to enable communications with other devices in the electronic environment 100 (e.g., the host computers 102). In some embodiments, the communications are IP-based, SAN-based, cellular-based, cable-based, fiber-optic-based, wireless, cloud-based, combinations thereof, etc. Additionally, the set of interfaces 602 is constructed and arranged to connect the electronic circuitry 600 to other local equipment such as the storage devices 134. In some embodiments, the set of interfaces 602 includes one or more host interfaces (e.g., a computer network interface, a fibre-channel interface, etc.), one or more storage device interfaces (e.g., a host adapter or HBA, etc.), and other interfaces. As a result, the set of interfaces 602 enables the electronic circuitry 600 to robustly and reliably communicate with various apparatus.

The memory 604 includes both volatile storage (e.g., DRAM, SRAM, etc.) and non-volatile storage (e.g., flash memory, magnetic memory, etc.). The memory 604 stores a variety of software constructs 620 including an operating system 622, specialized instructions and data 624, and other code and data 626. The operating system 622 refers to particular control code such as a kernel to manage computerized resources (e.g., processor cycles, memory space, etc.), the I/O stack (e.g., drivers), and so on. The specialized instructions and data 624 refer to particular instructions for lock management. In some arrangements, the specialized instructions and data 624 are tightly integrated with or part of the operating system 622 itself. The other code and data 626 include applications and routines to provide additional operations and services (e.g., performance measurement tools, etc.), user-level applications, administrative tools, utilities, and so on.

The processing circuitry 606 is constructed and arranged to operate in accordance with the various software constructs 620 stored in the memory 604. The processing circuitry 606 executes the operating system 622 and the specialized code 624 to form specialized circuitry that robustly and reliably manages locks of the multiple processing nodes 150. Such processing circuitry 606 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 690 is capable of delivering all or portions of the software constructs 620 to the electronic circuitry 600. In particular, the computer program product 690 has a non-transitory (or non-volatile) computer readable medium which stores a set of instructions that controls one or more operations of the electronic circuitry 600. Examples of suitable computer readable storage media include tangible articles of manufacture and apparatus which store instructions in a non-volatile manner such as DVD, CD ROM, flash memory, disk memory, tape memory, and the like.

The other componentry 608 includes other hardware of the electronic circuitry 600. Along these lines, in some embodiments, the electronic circuitry 600 further includes special user I/O equipment (e.g., a service processor), buses, cabling, adaptors, auxiliary apparatuses, other specialized data storage componentry, etc.

As described above, improved techniques are directed to configuring a first processing node to manage not only its own local lock requests, but also peer lock requests from a second processing node. Along these lines, the first processing node is provisioned with a first queue to enqueue both the local and peer lock requests. When processing a peer lock request, the first processing node removes the request from the first queue and sends the request to the second processing node that uses a second queue to obtain locks. In this manner, the first processing node manages lock ordering of both processing nodes, avoiding issues arising from out-of-order messaging and enabling the processing nodes to distribute access to the page proportionally to the amount of lock requests from each of the processing nodes.

One should appreciate that the above-described techniques do not merely collect and store data. Rather, the disclosed techniques include configuring processing nodes to enqueue lock requests to assign lock ownership of a page of memory. Accordingly, such techniques enable the processing nodes to share access to a page of memory.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the example environment 100 such as the data storage equipment 106, etc. are capable of being implemented in or "moved to" the cloud, i.e., to remote computer resources distributed over a network. Here, the various computer resources may be distributed tightly (e.g., a data storage system in a single facility) or over relatively large distances (e.g., over a campus, in different cities, coast to coast, etc.). In these situations, the network connecting the resources is capable of having a variety of different topologies including backbone, hub and spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN based communications, combinations thereof, and so on.

Some embodiments include an active/active cache in which, to maintain data consistency between nodes, data pages, which are the units at which LBA space is managed, are locked across cache nodes so that write and read operations are serialized. Each node maintains a queue of lock requests per data page, and messages are sent between nodes to achieve this.

In some embodiments, a namespace, which sits above cache, needs to serialize some of its operations between nodes, such as volume delete and volume create. To accomplish this in some embodiments, the namespace uses the cache locking semantics part of the I/O request, issuing I/O requests to a well-known LBA with no user data and requesting an exclusive lock on the page. Once the lock was granted, namespace could execute access operations and drop the lock from the transaction, rather than commit because no data was actually written as the I/O request was only used for lock semantics.

The improved techniques disclosed herein address a need for efficient and effective method of multi-node mutex locking. In some embodiments, a dedicated cache mutex mechanism enqueues all requests on the primary node and an acknowledgment message maintains message ordering. This dedicated mechanism is understood to not involve user data and will therefore avoid the loading of user data or the allocation of unnecessary resources. In addition, each mutex request is restricted to a single LBA which will allow cache to avoid costly checks in normal I/O operations to avoid deadlocks between multi-page overlapping I/O operations. This results in a more efficient distribution of locking access to nodes. Overall, the improved techniques improve the efficiency, performance, and effectiveness by reducing the latency of mutex operations, improving reliability by preventing possible path of operation failures, and improving product performance overall by reducing inter-node messages, which, in turn, reduces latency on other locking messages.

Some embodiments include two separate cache nodes that have a mechanism to reliably communicate. Further, each node uses a hash table to keep track of the negotiation of locked pages. In some embodiments, the table is indexed by LBA.

In some embodiments, each mutex page entry has an LBA, an access level, an outstanding lock count, a lock wait queue, and an acknowledgment count. The LBA is used to index the hash table and uniquely identifies the mutex page. The access level is used to indicate a level at which a page is locked for the particular nodes that it is on, e.g., exclusive, shared, none, etc. The outstanding lock count indicates a number of transactions that current have the page locked. For an exclusive lock, the number is one. For shared locks, the number may be any value greater than zero. For an access level of none, the outstanding lock count should be zero. The lock wait queue is a first-in, first out (FIFO) ordered queue of waiting lock requests waiting to take the lock. Both local and peer lock requests are placed on this queue. The acknowledgment count is a count of lock requests to the peer node that are waiting to be acknowledged. Acknowledgment messages are used to maintain inter-node message ordering.

In some embodiments, when a mutex page is released, the node decrements the outstanding lock count. If the outstanding lock count is zero, then the node will set the access level to none.

In some embodiments, the node identifies a lock request at a head of the lock wait queue. If the access level is none or if both the access level is shared and the lock request is for a shared lock, the node removes the lock request from the queue and notifies the lock requester. In some embodiments, all other combinations between the lock request and the mutex lock page access level wait on the lock wait queue until the mutex page is released.

In some embodiments, one cache node is designated as the primary for locking purposes and the other as the secondary. In these embodiments, all mutex lock requests are enqueued first on the primary node.

In some embodiments, when the secondary node receives an I/O request, the secondary node looks up the page in its hash table. If the page is not found, the secondary node adds the page to the hash table. The secondary node checks the acknowledgment count on the mutex page. If it is non-zero, the secondary node waits until it is zero. Once the acknowledgment count is zero, the secondary node forwards the request to the primary node via an inter-node lock request message. When the secondary node receives a response to its lock request from the primary node, the secondary node enqueues the lock request on the mutex page lock wait queue and acknowledges the lock request response from the primary node. Once the lock request reaches the head of the lock wait queue, the secondary node takes the lock by setting the access mode (if not set) and increments the outstanding lock count.

In some embodiments, when the primary node receives an I/O request, the primary node looks up the page in its hash table. If the page is not found, the primary node adds the page to the hash table. The primary node enqueues the lock request on the mutex page lock wait queue. Once the lock request reaches the head of the lock wait queue, the primary node checks the acknowledgment count on the mutex page. If it is non-zero, the primary node waits until it is zero. Once the acknowledgment count is zero, the primary node forwards the request to the secondary node via an inter-node lock request message. When the primary node receives a response to its lock request, the primary node takes the mutex lock by setting the access mode (if not set) and increments the outstanding lock count. The primary node further sends an acknowledgment to the secondary.

In some embodiments, when either of the primary node or the secondary node sends a response to the other node, the node further increments the acknowledgment count. Upon receiving a lock message acknowledgment from the peer node, the node decrements the acknowledgment count.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of sharing a page of memory among a first processing node and a second processing node, the method comprising:
   provisioning the first processing node with a first queue and the second processing node with a second queue;
   configuring the first processing node to enqueue, within the first queue, local lock requests to assign lock ownership of the page to the first processing node and peer lock requests to assign lock ownership of the page to the second processing node;
   configuring the second processing node to enqueue, within the second queue, the peer lock requests to provide lock ownership coordination of the page among the first processing node and the second processing node;
   enqueuing a peer lock request in the first queue, the peer lock request being received at the first processing node; and
   after the peer lock request reaches a head of the first queue, removing the peer lock request from the first queue and enqueuing the peer lock request within the second queue to assign lock ownership of the page to the second processing node.

2. The method of claim 1, further comprising:
   assigning lock ownership of the page to one of the first processing node and the second processing node in accordance with lock requests enqueued within the first queue.

3. The method of claim 1, wherein the peer lock request is received at the first processing node from the second processing node.

4. The method of claim 3, further comprising:
   after the peer lock request reaches the head of the first queue, transmitting a response to the second processing node to enqueue the peer lock request in the second queue; and
   after receiving an acknowledgment message from the second processing node, processing a second lock request in the first queue, the acknowledgment message indicating that the second processing node received the response, the acknowledgment message being provided to maintain lock ordering between the first processing node and the second processing node.

5. The method of claim 4 further comprising:
after transmitting the response to the second processing node, incrementing an acknowledgment count of the page, the acknowledgment count indicating a number of outstanding acknowledgment messages for the page between the first processing node and the second processing node; and
wherein processing the second lock request includes:
performing a comparison operation that compares the acknowledgment count to a predefined threshold; and
in response to the comparison operation indicating that the acknowledgment count is less than the predefined threshold, granting the second lock request.

6. The method of claim 1, further comprising:
in response to a local lock request reaching a head of the first queue, transmitting a lock request message to the second processing node, the lock request message indicating the local lock request to the second processing node; and
after receiving a reply to the lock request message from the second processing node, assigning lock ownership of the page to the first processing node and sending a reply acknowledgment message to the second processing node, the reply acknowledgment message indicating that the first processing node received the reply to the lock request message.

7. The method of claim 1 wherein the first processing node and the second processing node are constructed and arranged to perform access operations on pages in memory in atomically committed transactions; and
wherein the method further comprises:
processing a first lock request to assign lock ownership of the page in a first transaction; and
after processing the first lock request, processing a second lock request to assign lock ownership of the page in a second transaction, the first processing node and the second processing node using the page as a mutex to serialize the first transaction and the second transaction.

8. The method of claim 7, further comprising:
receiving instructions to perform a first set of input/output (I/O) requests before a second set of I/O requests; and
in response to receiving the instructions, generating the first lock request and the second lock request to serialize the first set of I/O requests in the first transaction and the second set of I/O requests in the second transaction.

9. The method of claim 1 wherein the page includes a mutex flag that identifies the page as a mutex; and
wherein the method further comprises:
in response to detecting the mutex flag, refraining from performing a deadlock avoidance operation on the page to conserve processor resources.

10. An electronic environment, comprising:
a first processing node and a second processing node;
memory; and
control circuitry coupled with the memory, the memory storing instructions that, when carried out by the control circuitry, cause the control circuitry to perform a method of sharing a page of the memory between the first processing node and the second processing node, the method including:
provisioning the first processing node with a first queue and the second processing node with a second queue;
configuring the first processing node to enqueue, within the first queue, local lock requests to assign lock ownership of the page to the first processing node and peer lock requests to assign lock ownership of the page to the second processing node;
configuring the second processing node to enqueue, within the second queue, the peer lock requests to provide lock ownership coordination of the page among the first processing node and the second processing node;
enqueuing a peer lock request in the first queue, the peer lock request being received at the first processing node; and
after the peer lock request reaches a head of the first queue, removing the peer lock request from the first queue and enqueuing the peer lock request within the second queue to assign lock ownership of the page to the second processing node.

11. The electronic environment of claim 10 wherein the method further includes:
assigning lock ownership of the page to one of the first processing node and the second processing node in accordance with lock requests enqueued within the first queue.

12. The electronic environment of claim 10 wherein the peer lock request is received at the first processing node from the second processing node.

13. The electronic environment of claim 12 wherein the method further includes:
after the peer lock request reaches the head of the first queue, transmitting a response to the second processing node to enqueue the peer lock request in the second queue; and
after receiving an acknowledgment message from the second processing node, processing a second lock request in the first queue, the acknowledgment message indicating that the second processing node received the response, the acknowledgment message being provided to maintain lock ordering between the first processing node and the second processing node.

14. The electronic environment of claim 13 wherein the method further includes:
after transmitting the response to the second processing node, incrementing an acknowledgment count of the page, the acknowledgment count indicating a number of outstanding acknowledgment messages for the page between the first processing node and the second processing node; and
wherein processing the second lock request includes:
performing a comparison operation that compares the acknowledgment count to a predefined threshold; and
in response to the comparison operation indicating that the acknowledgment count is less than the predefined threshold, granting the second lock request.

15. The electronic environment of claim 10 wherein the method further includes:
in response to a local lock request reaching a head of the first queue, transmitting a lock request message to the second processing node, the lock request message indicating the local lock request to the second processing node; and
after receiving a reply to the lock request message from the second processing node, assigning lock ownership of the page to the first processing node and sending a reply acknowledgment message to the second processing node, the reply acknowledgment message indicating that the first processing node received the reply to the lock request message.

16. The electronic environment of claim 10 wherein the first processing node and the second processing node are constructed and arranged to perform access operations on pages in memory in atomically committed transactions; and wherein the method further includes:

processing a first lock request to assign lock ownership of the page in a first transaction; and after processing the first lock request, processing a second lock request to assign lock ownership of the page in a second transaction, the first processing node and the second processing node using the page as a mutex to serialize the first transaction and the second transaction.

17. The electronic environment of claim 16 wherein the method further includes:

receiving instructions to perform a first set of input/output (I/O) requests before a second set of I/O requests; and in response to receiving the instructions, generating the first lock request and the second lock request to serialize the first set of I/O requests in the first transaction and the second set of I/O requests in the second transaction.

18. The method of claim 10 wherein the page includes a mutex flag that identifies the page as a mutex; and wherein the method further comprises:

in response to detecting the mutex flag, refraining from performing a deadlock avoidance operation on the page to conserve processor resources.

19. A computer program product having a non-transitory computer readable medium that stores a set of instructions to share a page of memory among a first processing node and a second processing node, the set of instructions, when carried out by computerized circuitry, causes the computerized circuitry to perform a method of:

provisioning the first processing node with a first queue and the second processing node with a second queue;

configuring the first processing node to enqueue, within the first queue, local lock requests to assign lock ownership of the page to the first processing node and peer lock requests to assign lock ownership of the page to the second processing node;

configuring the second processing node to enqueue, within the second queue, the peer lock requests to provide lock ownership coordination of the page among the first processing node and the second processing node;

enqueuing a peer lock request in the first queue, the peer lock request being received at the first processing node; and after the peer lock request reaches a head of the first queue, removing the peer lock request from the first queue and enqueuing the peer lock request within the second queue to assign lock ownership of the page to the second processing node.

20. The computer program product of claim 19 wherein the method further includes:

in response to a local lock request reaching a head of the first queue, transmitting a lock request message to the second processing node, the lock request message indicating the local lock request to the second processing node; and after receiving a reply to the lock request message from the second processing node, assigning lock ownership of the page to the first processing node and sending a reply acknowledgment message to the second processing node, the reply acknowledgment message indicating that the first processing node received the reply to the lock request message.

* * * * *